(12) United States Patent
Ting (10) Patent No.: US 8,327,421 B2
(45) Date of Patent: Dec. 4, 2012

(54) SYSTEM AND METHOD FOR IDENTITY CONSOLIDATION

(75) Inventor: David M. T. Ting, Sudbury, MA (US)

(73) Assignee: Imprivata, Inc., Lexington, MA (US)

( * ) Notice: Subject to any disclaimer, the term of this patent is extended or adjusted under 35 U.S.C. 154(b) by 1208 days.

(21) Appl. No.: 11/699,756

(22) Filed: Jan. 30, 2007

(65) Prior Publication Data

US 2008/0184349 A1    Jul. 31, 2008

(51) Int. Cl.
*H04L 29/06* (2006.01)

(52) U.S. Cl. ............... 726/5; 713/186; 713/201; 726/7; 726/8

(58) Field of Classification Search ................. 726/7, 8; 713/186, 201
See application file for complete search history.

(56) References Cited

U.S. PATENT DOCUMENTS

| | | | | |
|---|---|---|---|---|
| 6,026,440 A * | 2/2000 | Shrader et al. | ................ | 709/224 |
| 6,651,168 B1 * | 11/2003 | Kao et al. | ...................... | 713/185 |
| 6,892,307 B1 * | 5/2005 | Wood et al. | ........................ | 726/8 |
| 6,957,337 B1 * | 10/2005 | Chainer et al. | ................ | 713/186 |
| 7,634,803 B2 * | 12/2009 | Birk et al. | .......................... | 726/8 |
| 2003/0126441 A1 * | 7/2003 | Laux et al. | .................... | 713/168 |
| 2004/0117665 A1 * | 6/2004 | Ong | ............................. | 713/202 |
| 2006/0080352 A1 | 4/2006 | Boubez et al. | | |

* cited by examiner

*Primary Examiner* — Brandon Hoffman
*Assistant Examiner* — Michael D Anderson
(74) *Attorney, Agent, or Firm* — Bingham McCutchen LLP (57) ABSTRACT

Application-specific and single-sign-on user-authentication credentials are analyzed and consolidated based on commonalities among the credentials and usage of the applications to which they are attributed according to a process whereby a plurality of user-authentication credentials each associated with a different computer application are received; at least a subset of the plurality of user-authentication credentials are associated with each other based on consistencies among the associated authentication credentials and observed application usage patterns attributed to each respective user-authentication credential; an identity signature is created for the individual based on the subset of associated user-authentication credentials; and the identity signature is attributed to the individual.

29 Claims, 8 Drawing Sheets

| Application 305 | Active Directory | Active Directory | Active Directory | Atex Editorial | Secure Shell (SSH) | Outlook | Instant Messenger | Employee Portal |
|---|---|---|---|---|---|---|---|---|
| UserID 310 | CKent | Superman | Kal.el | ckent | Superman | Kal.el | Kryptonite | Kal.el |
| Password 315 | Loislane | Kryptonite | Jor-el | Perrywhite | Krypton | Lexluthor | Krypton | Smallville |

FIG. 3

| SSO Database and Active Directory | Atex Editorial | Secure Shell (SSH) | Outlook | Instant Messenger | Employee Portal |
|---|---|---|---|---|---|
| CKent – Loislane | Ckent – Perrywhite | Superman – Brainiac | | | Kal.el – Smallville |
| Superman – Kryptonite | | Superman – Brainiac | | Kryptonite – Krypton | |
| Kal-el – Jor.el | | | Kal.el – Lexluthor | Kryptonite – Krypton | Kal.el – Smallville |

| SSO Database and Active Directory | Atex Editorial | Secure Shell (SSH) | Outlook | Instant Messenger | Employee Portal |
|---|---|---|---|---|---|
| LLuthor – Evil | LLuthor – Kryptonite | | LuthorLex – MadScientist | | Lex – Metropolis |
| Lexy – Underworld | | Lexy – Underworld | | | |
| Brainiac – Kryptonite | | | Brainiac – Kryptonite | KillSuperman – ILoveLois | |

SYSTEM AND METHOD FOR IDENTITY CONSOLIDATION

FIELD OF INVENTION

The invention relates generally to controlling and managing computer system access and authentication. More specifically, the invention relates to systems and methods for consolidating user authentication data based on commonalities among authentication credentials, application usage profiles and/or physical access data.

BACKGROUND

The number of computer applications used by large corporations has increased significantly over the past twenty years. For example, companies may employ separate applications for electronic mail, document control, financial applications, inventory management, manufacturing control and engineering functions, in addition to overall network access. Each application often requires a separate logon procedure, including some form of personal identification such as a user ID, a password, a key sequence or biometric authentication. The increase in the number of applications requiring user authentication demands significant effort on the part of users to create, secure, and remember their authentication data. Furthermore, from a management perspective, the proliferation of computer applications with varying security and sign-on procedures adds significant cost to the ongoing maintenance of a secure information-technology infrastructure.

The user faces similar logon requirements when accessing server-based applications over the Web. For example, the user may face different logon procedures (typically involving different passwords) to access bank accounts, brokerage accounts, subscription content sites, etc.

Indeed, the mere need for computer users to keep track of multiple logon names, passwords and PINs in order to access different information itself increases the chances of unauthorized use and loss of private information. Users may resort to using the same logon name and password combinations for all accounts, rendering them equally vulnerable if unauthorized access to a single account is obtained. On the other hand, security-conscious users who maintain different logon names and passwords for individual accounts may, to avoid confusion, write them down where they may be found or store them on easily stolen devices such as personal digital assistants—thereby undermining their own efforts. Often those who routinely change their passwords but record them on paper or in a computer file are at greater risk of being compromised than those who use a single but difficult-to-crack password. At the very least, such security-conscious individuals risk forgetting their access information, necessitating time-consuming calls to customer-support lines. In some known systems, different applications may attempt to synchronize their logon procedures and user credentials, but this is often limited to applications from particular suppliers and cannot be extended across varying technology platforms.

Enterprises often maintain identity information in multiple directory stores in addition to the numerous application stores used to track application-specific account information. These stored identities may or may not link to the true identities of individual users. Users and administrators create aliases, shared accounts, and orphan accounts due to inadequate or poor tracking information (to identify the true user), absence of a robust de-provisioning process and/or poor enforcement of password-sharing and account-management policies.

System administrators are often charged with determining the actual unique identities of individuals associated with numerous application account credentials by manually comparing attributes (e.g., a phone number, an email address, or an employee number) associated with the credentials. One way to discover identities is to scan the credentials for each application (in, for example, an application-specific database, central employee database, or other shared authentication data store) in order to identify similarities among attributes. By locating multiple accounts associated with a particular user, it may be possible to learn the user's true identity. This process can be time consuming and labor intensive, and requires transitive lookups from one application database or directory to another by, for example, following links and, where necessary, using rules or fuzzy logic to verify the accuracy of each piece of information. If an account in one application is tied to an email address, for example, then the identity of the user in the email directory needs to be retrieved to obtain the employee ID, and so on, until some link leads to the user's true identity. In many instances, multiple user accounts can be associated with one individual, multiple users may share accounts in other applications, and in some legacy environments, inaccuracies can lead to dead ends in which there is no way to obtain the identity of the user from information in the application database itself.

What is needed, therefore, is the ability to consolidate user authentication data within application and directory stores in a way that facilitates automatic attribution of such authentication data to specific individuals. Having a distinct map of how resources are linked to the true identity of the individual is critical from both a management and security perspective.

SUMMARY OF THE INVENTION

The present invention discovers relationships among user identities and application accounts in a manner distinctly different from traditional methods. The system builds a cross-reference of active users across a set of applications and logon credentials used by each user over a period of time. Each time the user accesses an application, the application-specific credentials associated with the user are retrieved for purposes of authentication. By pooling credentials (account name and password, for example) and any other user identity information into a single physical or logical database, embodiments of the invention provide a multi-dimensional mapping between individual users and the numerous application-specific authentication credentials for those applications. This data is extremely useful for inferring relationships among numerous user identities.

Application account and password information attributed to an individual's user-authentication credentials for various applications is used to create a user signature, thus facilitating consolidation of multiple user credentials and attribution of the credentials to specific individuals. Identity mappings defined within an aggregated database of collected logon and application usage information cannot be replicated simply by looking through the independent databases containing application logons. This is because such mappings are inferred based on, for example, the similarities in the applications to which a user has access, the account logon name and the password used. Thus, instead of merely searching for matches across databases, inferences can be drawn using data gathered from multiple sources over time. Various data-obfuscation techniques may also be used to maintain the privacy of the credentials and to facilitate the building of cross-reference tables in a secure fashion.

In one aspect, the present invention comprises a method for attributing user-authentication credentials to an individual includes receiving user credentials and creating an association among the user-authentication credentials based on consistencies among the authentication credentials and observed application usage attributed to the user-authentication credentials. An identity signature is created based on the associated user-authentication credentials and attributed to an individual.

In some embodiments, the user-authentication credentials are encrypted by, for example, the application of a one or two-way hash. Encryption can be applied prior to or after receipt of the credentials, and the encrypted credentials can be used to create the associations. The user-authentication credentials can include, for example, an identification code, a secure access code, a screen name, and/or a password for gaining access to secure computer systems and applications. In some embodiments, the user-authentication credentials include biometric data such as fingerprints, facial or retinal scans, and/or voiceprints. Data from physical access systems (e.g., card-swipe data) can also be incorporated into the user signature to augment and possibly enhance the accuracy of the signature.

The observed application usage can include users logging into an operating system, logging into an application, using certain functions within an application and/or navigating to screens within an application. The application usage can be static (e.g., user names, roles or credentials) and/or dynamic, such as application usage or data that changes over time. Consistencies across user IDs can be inferred based on the credentials and/or the observed data, and in some cases a match probability is calculated that quantifies the certainty that credentials can be associated with each other. The authentication credentials used to create the signature may be selected based on the probabilities associated with the credentials. Weights can be attributed to the credentials, such that certain credentials have greater impact on the resulting match probability. The match probability can then be compared to predefined or evolving match thresholds to determine if the authentication credentials should be attributed to an individual.

In a second aspect, the invention comprises a system for attributing computer system authentication credentials to an individual. The system includes an identity signature data store for storing user-authentication credentials in connection with a plurality of computer applications and a mapping module for creating a user signature based on the user-authentication credentials and attributing the user signature to an individual.

The mapping module can, in certain implementations, infer relationships among the authentication credentials based, for example, on observed application usage. An interface (e.g., an API or XML-based web-service) may also be included to request and/or receive data from physical access systems, thus allowing the mapping module to incorporate physical access data into the user signatures and/or the match probabilities.

The system can also include a single-sign-on agent that receives the user-authentication credentials from an identity server and transmits application-specific authentication credentials to the appropriate computer applications to facilitate single-sign-on functionality. The agent can also provide the user authentication criteria (the single-sign-on credentials, application-specific credentials, or both) to the mapping module for inclusion in the mapping process.

In another aspect, the invention provides a method for attributing user-authentication credentials to an individual that includes receiving user-authentication credentials, monitoring activities of the user (e.g., logging on to secure computer systems, using computer applications, and/or entering or leaving secure environments) and based on the monitored activities, inferentially determining the likelihood that a new activity is associated with the user exceeds a predetermined threshold.

In yet another aspect, the invention provides a method of detecting shared usage of user-authentication credentials that includes receiving requests for access to a secure resource, each request including user-authentication credentials and constructing a request profile for each request based on the provided user-authentication credentials. The method further includes identifying common user-authentication credentials received in requests having different request profiles, thereby detecting shared usage of the one or more user-authentication credentials.

In another aspect, the invention provides an article of manufacture having a computer-readable medium with computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM or downloaded from a server. The functionality of the techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

Other aspects and advantages of the invention will become apparent from the following drawings, detailed description, and claims, all of which illustrate the principles of the invention, by way of example only.

BRIEF DESCRIPTION OF THE DRAWINGS

The above and further advantages of the invention may be better understood by referring to the following description taken in conjunction with the accompanying drawings, in which.

DETAILED DESCRIPTION

Figure 1:
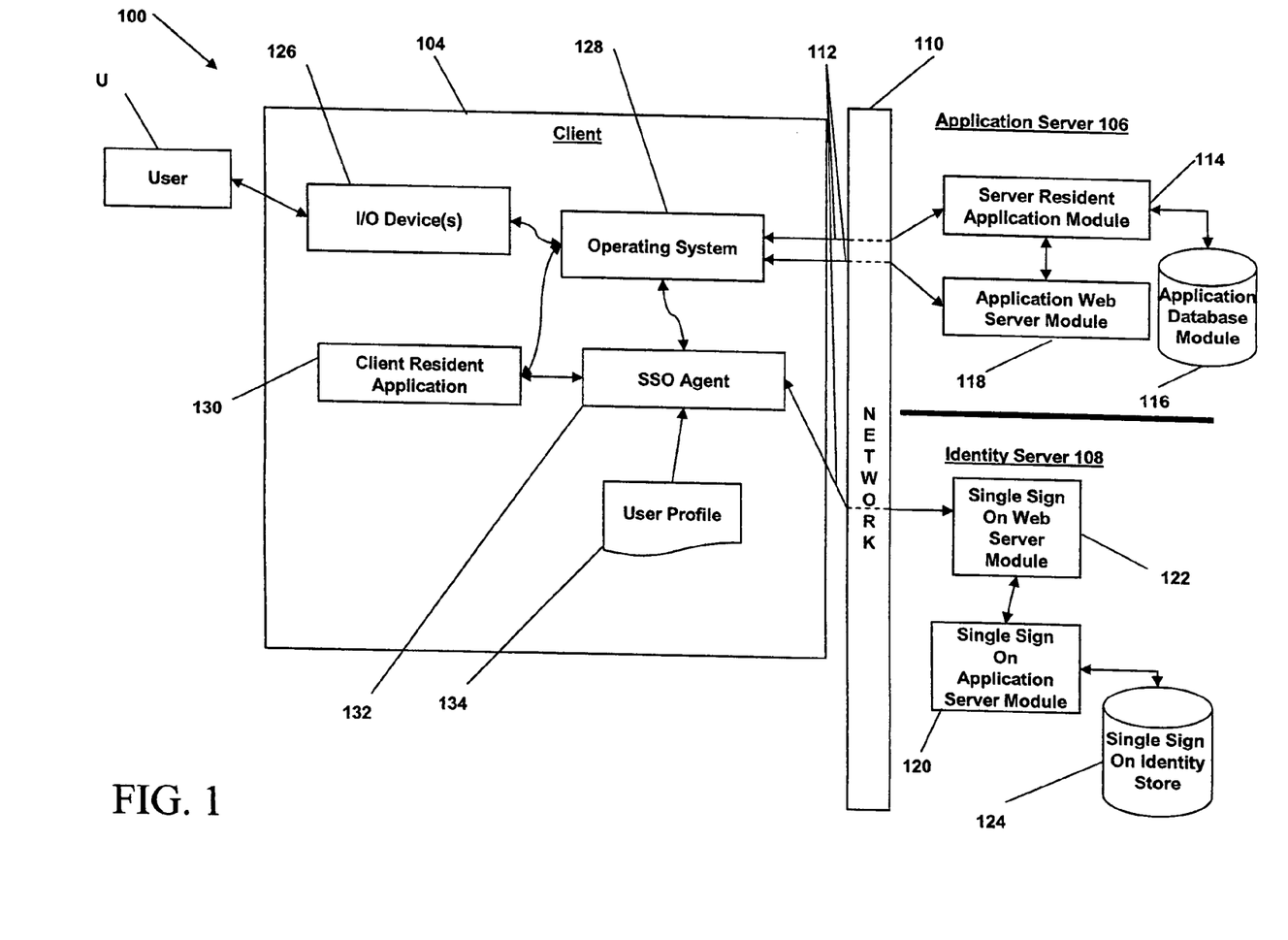
FIG. 1 is a block diagram of a system to authenticate a user and automate logon to one or more applications using a client-resident user profile and a single-sign-on server.

In broad overview, FIG. 1 illustrates an embodiment of a system 100 to automate user logon procedures, audit the user's activity within one or more applications, and consolidate user-authentication credentials in a central data store. The system 100 includes a first computing system (a "client") 104, a second computing system (an "application server") 106 and a third computing system (an "identity server" or "single-sign-on server") 108, all in communication with each other via a network 110. The client node 104 is used by one or more users, indicated graphically at U. The client node 104, the application server 106 and the identity server 108 are in communication with the network 110 using communication channels 112.

For example, the communication channels 112 can connect the client 104 to a local-area network (LAN), such as a company intranet, a wide area network (WAN) such as the Internet, or the like. The client 104 and servers 106, 108 communicate with the network 110 through the communication channels 112 using any of a variety of connections including, for example, standard telephone lines, LAN or WAN links (e.g., T1, T3, 56 kb, X.25), broadband connections (ISDN, Frame Relay, ATM), wireless connections (e.g., 802.11, Bluetooth), and the like. The connections can be established using a variety of communication protocols (e.g., HTTP(S), TCP/IP, SSL, IPX, SPX, NetBIOS, Ethernet, RS232, direct asynchronous connections, a proprietary protocol, and the like). In one embodiment, the client 104 and the servers 106, 108 encrypt all communication when communicating with each other.

Each of the servers 106, 108 can be any computing device capable of providing the services requested by the client 104. Particularly, this includes logging into secure applications, tracking user activities within applications, and terminating a user's access to applications as described in more detail below.

The application server 106 includes one or more server-resident application modules 114 and one or more application database modules 116. The application server 106 may also include an application web server module 118 to facilitate communication with the client 104 over the network 110 where the communication network 110 is the Internet, an intranet, or the like. The identity server 108 includes a single-sign-on application server module 120, a single-sign-on web server module 122, and a single-sign-on identity data store 124. The modules throughout the specification can be implemented in whole or in part as a software program and/or a hardware device (e.g., ASIC, FPGA, processor, memory, storage and the like).

For purposes of illustration, FIG. 1 depicts an application server 106 as an entity separate and distinct from the identity server 108 and each server in independent communication with the network 110. It is to be understood, however, that the servers 106, 108 can also be implemented, for example, on a single server (e.g., as logically distinct modules), distributed on portions of several (i.e., more than two) servers, and/or as part of a single server node or server farm in communication with the network 110 through, for example, a single web server (not shown). It should further be understood that even if two logical servers are running in the same physical machine, they may be secured logically if any of the following conditions are met: (1) the servers run in different process spaces (so there is no possibility for one process to access the memory of another process); (2) the servers access different logical databases (which may be further partitioned) with different credential or entry requirements; (3) sensitive data in the application server 106 and the single-sign-on server 108 are encrypted using separate encryption keys; or (4) the server applications are launched (e.g., in a Unix environment) under two different logon accounts. For heightened security, some or all of the data used by the servers 106, 108 using a key maintained by the application server 106 or an external key server. This approach enhances security because a breach of the identity server 108 and its database 124 would yield only encrypted data.

The client 104 can be any computing device (e.g., a personal computer, set top box, wireless mobile phone, handheld device, personal digital assistant, kiosk, etc.) used to provide a user interface to access the application server 106. The client 104 includes one or more input/output devices 126 such as a keyboard, a mouse, a screen, a touch-pad, a biometric input device, and the like. The client 104 also includes an operating system 128. Operating systems supported by the client 104 can include any member of the WINDOWS family of operating systems from Microsoft Corporation. The client 104 may also include one or more client-resident applications 130, such as INTERNET EXPLORER developed by Microsoft Corporation, NETSCAPE NAVIGATOR offered by AOL Time Warner, FIREFOX developed by the Mozilla Foundation, or ATTACHMATE developed by Attachmate Corporation.

To use the system 100, a user U registers that user's authentication data for one or more applications with the application server 106. The authentication data can include, for example, a password, a user identification number, or biometric data associated with the individual's fingerprint(s), facial characteristics, voice, and the like. The system 100 stores authentication data identifying the user to the system (e.g., username, logon ID, employee ID, and the like) in the application database module 116. The application database module 116 may also associate an alias with that stored data. For example, employee #2054 may be associated with the alias 719jLL01. As the user logs into an application 114 (residing on the application server 106) via the network 110, a single-sign-on agent 132 residing on the client 104 captures the authentication data entered by the user U using one or more input devices 126 and transmits (or causes the transmission of) the authentication data to the single-sign-on web server module 122 residing on the identity server 108. The single-sign-on agent 132 captures the data by, for example, monitoring a messaging queue for instructions sent to and from the operating system, intercepting HTTP requests sent to and from the network 110, capturing screen images sent to the output device(s) 126, or any other suitable methods. The single-sign-on web server module 122 provides the authentication data to the application server module 120, which in turn stores the data in the identity data store 124. The single-sign-on application server module 120 then retrieves the updated authentication data and sends it to the client 104 using the web server module 122 and the single-sign-on agent 132. The authentication data can be stored on the client 104 in the user profile 134 for future use by the single-sign-on agent 132 residing on the client 104. Thereafter, as the user logs into an application in the usual fashion, the single-sign-on agent 132 operates in the background, gathering and transmitting to the various application servers 106 all the information necessary to automate subsequent logons.

Alternatively, or in addition, the single-sign-on agent 132 may reside on a server. This embodiment is particularly useful in a "thin-client" environment, such as CITRIX METAFRAME. In this embodiment, a user U connects to a server where the single-sign-on agent 132 resides. This server, in turn, communicates with the application server 106 and identity server 108. The displayed output (such as HTML or screen dumps, for example) is obtained indirectly from the application server 106, by way of the server on which the single-sign-on agent 132 resides; that is, this additional server runs the single-sign-on agent 132 and passes back the display information (as pixel values, markup code, or any other suitable display modality) to the client 104.

The user profile 134 can contain various data furthering the function of the invention, such as a user identification code; an authentication modality (such as password, biometric data, or the like); an application profile (such as a user's rights and privileges within an application); an application credential for access (such as a user's password, a digital representation of biometric data, or the like); and/or audit records of a user's activities within an application. The single-sign-on agent 132 can then use the data stored in the user profile 134 to determine which HTTP requests to intercept, to complete logon screens with stored authentication data, and the like.

In the illustrated embodiment, there are security measures that the system 100 can use to ensure that a listening device does not capture this authentication data, or if the data is captured, that it is not usable by itself. For example, the single-sign-on agent 132 can encrypt the alias and the biometric data independently; the single-sign-on agent 132 and the single-sign-on database 124 can communicate with each other using SSL and/or public and private keys; and/or the single-sign-on agent 132 can transmit the alias and the authentication data independently to the single-sign-on database 124.

The registration process can be initiated in several different ways. In some cases, the responsible technology administrator initiates the registration. For example, the administrator can have the user come to the administrator's client 104 or to a secure client 104 used only for registration when the employee starts work, when a customer purchases services accessible via the application server 106, and the like. Alternatively, the application server 106 can initiate registration when the user first requests a service from the application server 106 requiring user authentication. The client 104 can display a graphical user interface ("GUI") leading the user through the registration process. The level of authentication of the user at registration may be selected by the administrators of the system 100 and can range, for example, from a user presenting the correct password to the application server 106 to a user being present in person in front of an administrator who can check the user's identification.

Once the system 100 registers an individual, the single-sign-on application server module 120 creates an association between the data identifying the user to the single-sign-on system and the user's alias in the application database 116, and another association between the user's alias and the user's authentication data in the identity data store 124. Storing the two associations at locations separate from each other prevents identity theft absent a breach in security of both the application database 116 and the single-sign-on database 124; only then could authentication data be combined with some identifying data. For example, the first association may be stored in the application database module 116 residing on one physical server, while the second association may be stored in the identity data store 124, residing on a second physical server. Further, if the identifying data is just another unique identifier that does not reveal identity by itself, for example an employee number, then the security of a third database (not shown) containing the association between the employee number and the identity (e.g., name and address of the employee) would have to be breached to match the identity of the user with that individual's biometric data.

With an individual registered in the single-sign-on server 108 (i.e., with user-identifying information, an alias, and authentication information obtained and stored in the identity data store 124), a user may be authenticated to one or more applications without having to provide authentication information for the application(s) each time she requests access. The user U of the client 104 logs into the single-sign-on server 108 by providing one or more of a password, user identification code, biometric data, or the like. The identity server 108 authenticates the user based on the information provided and retrieves the user profile 134 associated with the user U from the single-sign-on identity store 124, and sends the user profile 134 to the client 104, thereby allowing the single-sign-on agent 132 to control access to individual applications.

Figure 2:
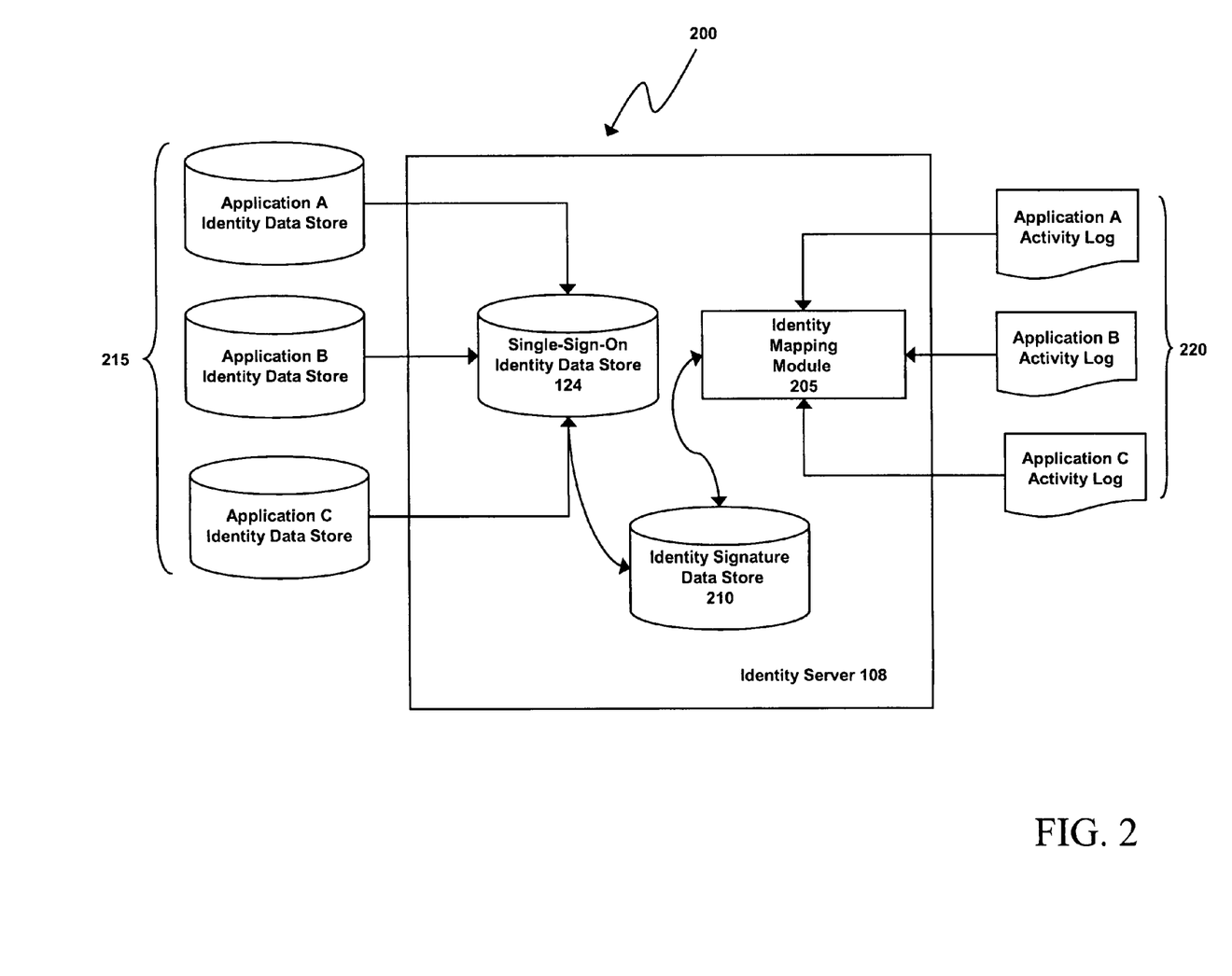
FIG. 2 is a block diagram of a system for consolidating and validating multiple application identification credentials across various logical data stores in accordance with the invention.

FIG. 2 illustrates generally a system 200 in which the identity server 108 may be used to capture application-specific user-authentication credentials as well as application usage data to identify instances of duplicate IDs (i.e., a user having multiple authentication credentials in one organization) and shared IDs (i.e., two or more users using the same credentials to access applications). The system 200 includes the identity server 108 of FIG. 1, as well as a centralized identity signature data store 205 for maintaining application-specific user-authentication credentials and an identity mapping module 210 for processing the credentials in accordance with the invention.

Operationally, various applications (e.g., Applications A, B and C) maintain application-specific identity data stores (collectively indicated at 215) that typically include user-authentication credentials, restrictions, authentication levels, and may also include application usage rules, role-based attributes, and other information regarding users of the applications. In addition to storing user access information, the applications may also monitor the activities of users as they interact with the applications and in some cases store such information in one or more application activity logs 220. The activity logs 220 may be maintained in a separate database, stored on separate servers, written to data files, or some combination of both depending on the specific requirements of each application. For example, an equity trading application likely has significant transactional logging and monitoring requirements and therefore maintains detailed histories of which users performed specific tasks within the application. Other applications such as web portals or email clients may have fewer such requirements. In either case, the log data 220 can be combined with the application-specific identity data 215 as part of the identity consolidation process.

As noted above, the existence of multiple user accounts for individual users and the sharing of user credentials can create security flaws. In certain instances these flaws may be relatively minor issues, such as improper use of valuable system resources or licenses. In other cases, users may find and take advantage of multiple IDs and authentication credentials to obtain unauthorized access to secure accounts exposing the company maintaining those accounts to significant financial and/or criminal liabilities.

Figure 3:
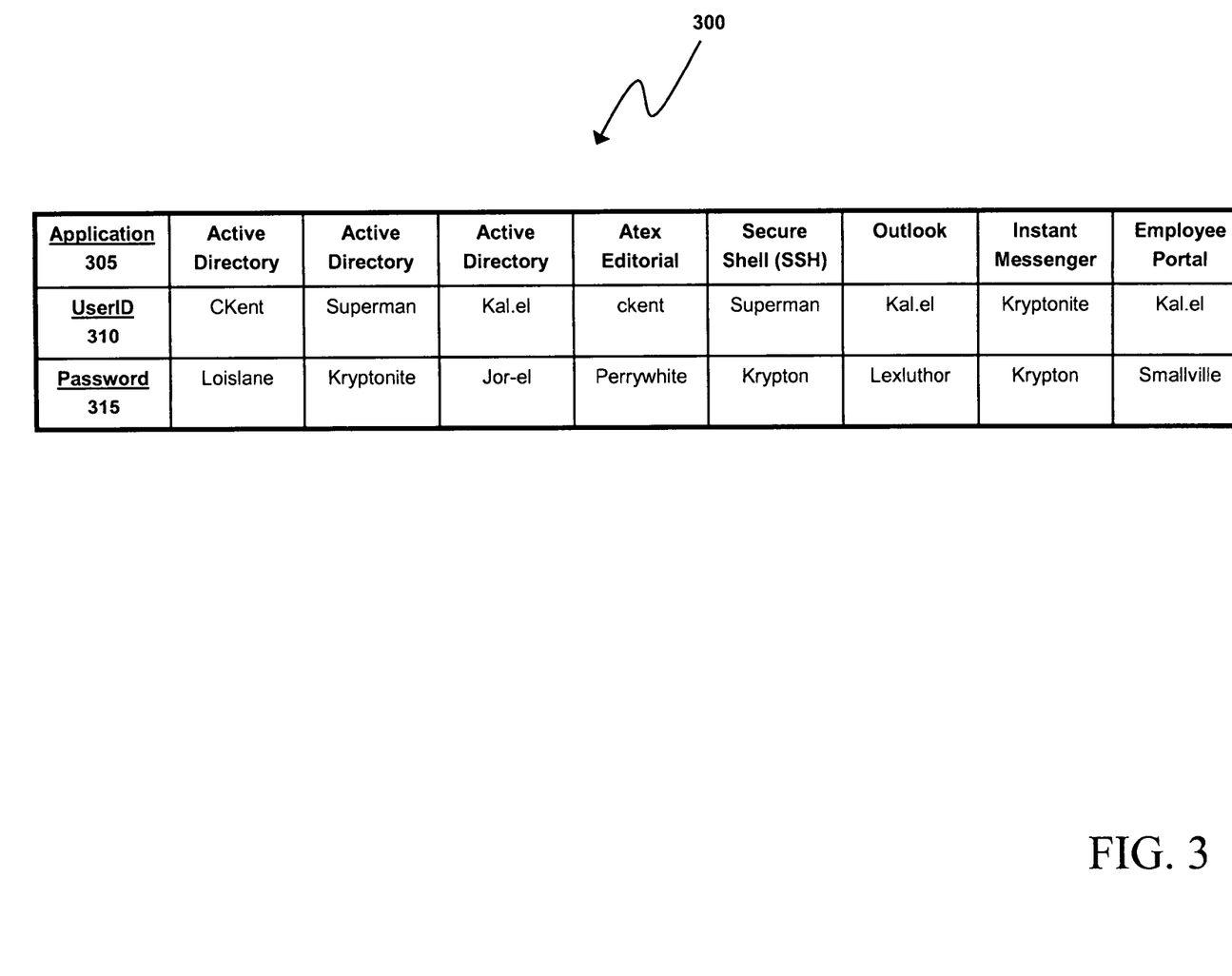
FIG. 3 is a tabular listing of user-authentication credentials for multiple applications.

Referring now to FIG. 3, consider the case of Clark Kent who works in the editorial department of a newspaper, and whose application credentials are summarized in table 300. Clark logs onto the domain via Microsoft Windows' Active Directory identity management procedures as CKent@dailyplanet.com and a password of loislane, and uses the Atex editorial system using the user ID "ckent." He also moonlights in the IT department and logs into Active Directory using the email alias Superman@dailyplanet.com and accesses the network from a secure shell (SSH) application as "superman." Furthermore, he has on occasion logged into the SSH application while simultaneously logged into Active Directory using his CKent account using the ID "superman." In other instances, Clark uses the Active Directory ID "kal.el@dailyplanet.com" and retrieves mail from the email server using the ID "kal.el." Each of these IDs also has a password associated with it, as indicated at 315. In effect Clark has three aliases mapped to his real name (kal-el) and unless adequate tracking information is contained in each account he uses, there is no way to tie each of the account names to Clark as a unique individual. However, when he is logged in as Clark, Superman, and kal.el, Clark uses the same corporate portal account (kal.el) to check on stock prices and health benefits, as well as the same instant messenger account (kryptonite) for online chat applications. Further, Clark often allows his co-worker Jim Olsen to use his Atex and SSH accounts by providing Jim with Clark's username and password while Jim is logged into Active Directory using his own authentication credentials, JOlsen and DPlanet. By using multiple identities and sharing authentication credentials, Clark and Jim introduce security breaches and accountability errors into the system and application environment.

Figure 4:
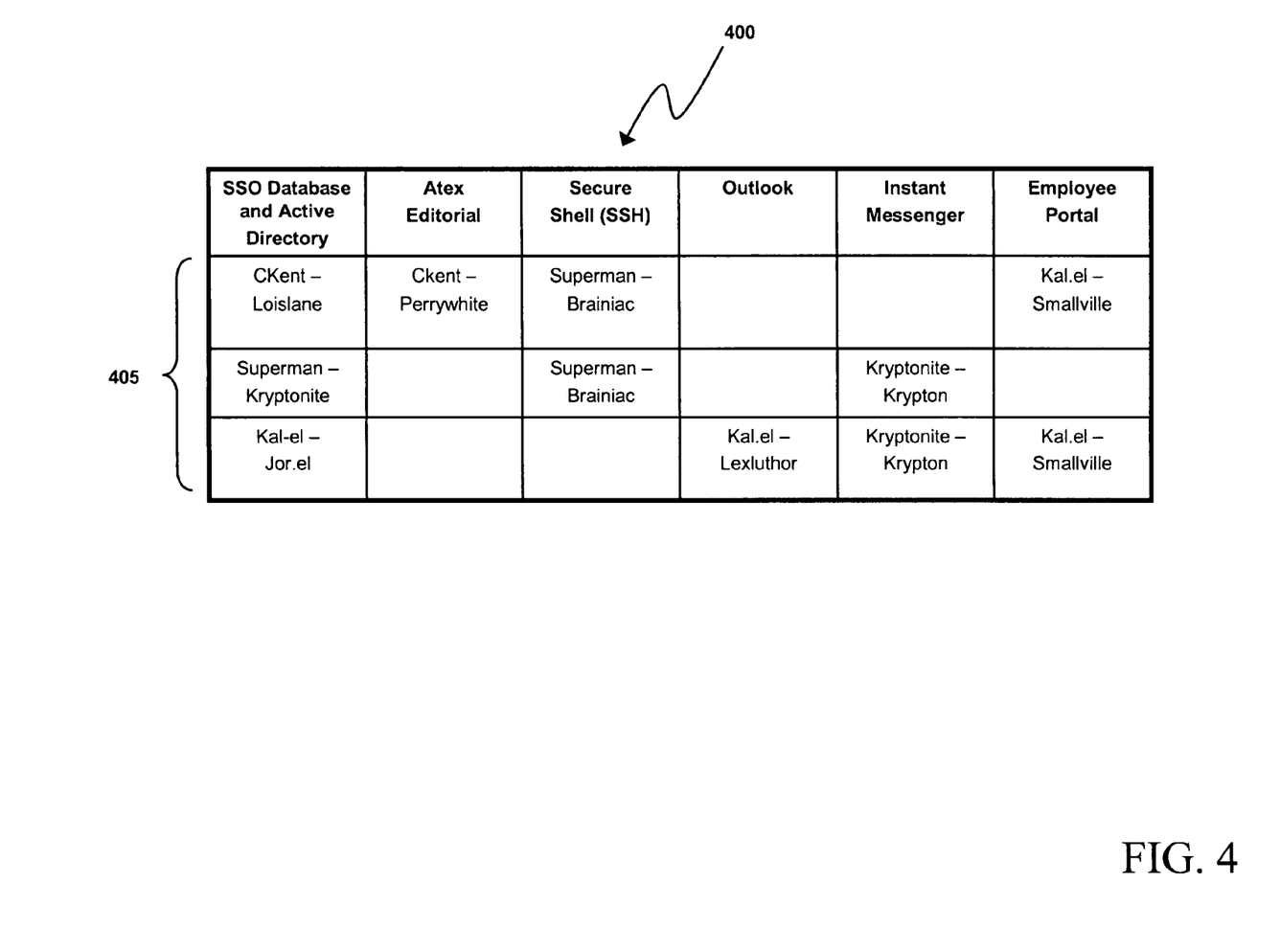
FIG. 4 is a tabular listing of user-authentication credentials for multiple applications and a single-sign-on directory in accordance with the invention.

Referring to FIG. 4 the authentication credentials for each application may be stored in a single identity data store and combined with data from a single-sign-on system as described above with reference to FIG. 1 and in U.S. patent application Ser. No. 10/395,043, entitled "SYSTEM AND METHOD FOR AUTOMATED LOGON" (the entire disclosure of which is incorporated herein by reference) to address these flaws. Specifically, each row in table 400 represents unique Active Directory logon credentials 405 used by Clark to access various applications at the paper, and the entries at each column represents the user ID and password combinations he uses as authentication credentials for each of the applications listed along the top row.

Typically, the application-specific credentials are stored in separate data stores attributed to each application, and as such none of the application-specific databases can associate the CKent, superman and Kal.el user-authentication credentials with each other or with Clark as an individual. However, by including the application-specific credentials in the identity data store 210, the identity mapping module 205 can make certain inferences about the "CKent/loislane" and "superman/kryptonite" credentials based on the three sets of application credentials (SSH, Instant Messenger, and the Employee Portal). Furthermore, kal.el is a good match for CKent and Superman because they each match on two sets of application credentials (Instant Messenger and the Employee Portal.) Moreover, an inference can be made that the "ckent/perrywhite" authentication credentials for the Atex system is in fact attributable to the same individual who logs in using the "Kal.el/Jor.el" credentials based on previously observed common application usage of Instant Messenger and the Employee Portal. Therefore, even though Clark Kent has been purposely hiding his secret identity by maintaining alias identities, these identities can be consolidated into a single identity signature that can be attributed to Clark based on his association with the single-sign-on credentials.

In addition to identifying matching application credentials, a user's application usage patterns can also be employed to discover the true identity of the individual associated with multiple application and/or single-sign-on user IDs. In such cases, both static data (e.g., consistent user credentials) and dynamically obtained information (e.g., application usage over time) can be analyzed to determine if matches or near-matches exist that would imply identities associated with coincident rows in the single-sign-on credential table 400 have some probability of mapping to the same true identity. The overall probability that multiple identities are in fact the same individual can be a function of the matches and/or mismatches within the credential table. For example, the use of similar credentials across one highly-secured application (e.g., a payroll, a database containing personally indefinable information, or a HIPPA-compliant healthcare application) may imply a high degree of certainty that two matching credentials can be attributed to the same person. However, users of other applications that are less secure (e.g., instant messaging, a document-control application, or a room-reservation system) may share credentials with other users, and therefore finding common credential usage across multiple single-sign-on identities may contribute only marginally to the overall match probability. In one particular implementation, each application is assigned a weighting factor that is applied to a normalized probability function such that matches (or mismatches) for individual applications contribute to the overall match probability according to a predetermined formula. For example, if matches between credentials for an email application are considered twice as reliable as those from a room-reservation application, and matches between credentials used to logon to a Virtual Private Network (VPN) are considered three times as reliable as those from the room-reservation application, the overall match probability can be calculated as follows:

$$(2*0.8+3*0.7+1*0.9)/6=0.76$$

where the individual match probabilities for the room-reservation application, email application, and VPN are 0.9, 0.8, and 0.7, respectively.

In addition to positive indicators, negative indicators may also be factored into the match probability. For example, the provision of different single-sign-on logon credentials and the same application-specific credentials may, at first blush, be a strong indicator that the two single-sign-on logon credentials should be attributed to the same individual. However, stark differences in application usage characteristics may indicate otherwise, and in fact provide evidence of ID sharing among individuals. Examples of some usage characteristics that may reduce the match probability include accessing the applications from different IP addresses, MAC addresses, subnets and/or physical locations, using different screens or functions within the application, or concurrent use of the two IDs from different machines.

Once a match probability is calculated, it can be compared to one or more thresholds to determine if in fact the multiple credentials should be consolidated and/or attributed to an individual. At certain levels of confidence (e.g., 99.99% for highly secure applications), inferred relationships among application credentials can be used to pre-populate logon screens, or in some instances even bypass them altogether.

Figure 5:
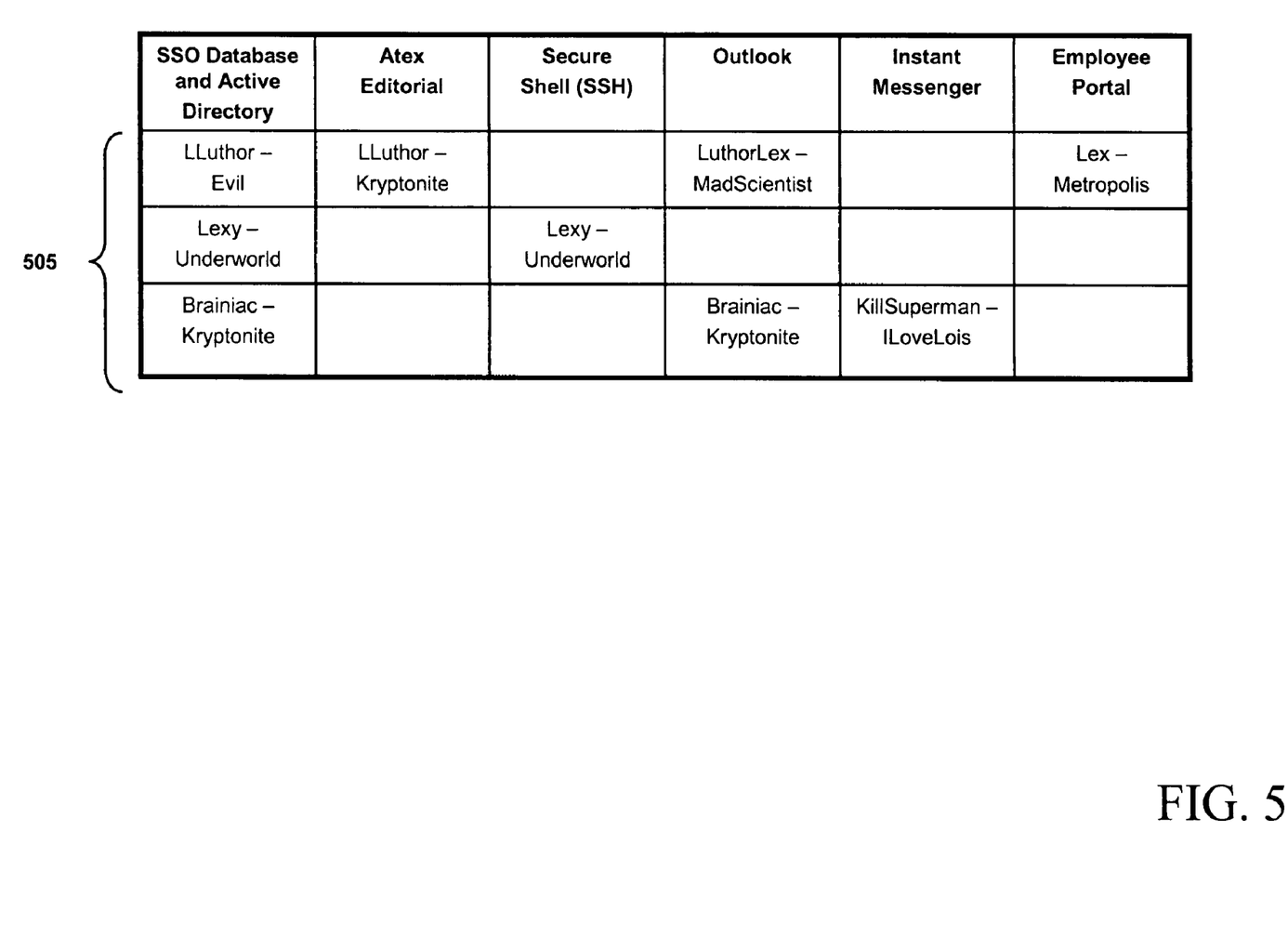
FIG. 5 is an alternate tabular listing of user-authentication credentials for multiple applications and a single-sign-on directory in accordance with the invention.

Referring to FIG. 5, similar techniques can be applied to a more challenging scenario in which there are no common IDs used across SSO/Active Directory IDs. Consider Clark's nemesis, Lex Luthor, who also works at the newspaper but, unbeknownst to management, uses the computer systems for certain illegal activities. Therefore, in an attempt to hide his actions, Lex has three separate single-sign-on credentials 505 with which he can authenticate himself to the Active Directory server, and he is careful not to use common authentication credentials for the same application when logged in to the identity server as two different users. For example, Lex may use the Brainiac/Kryptonite credentials when using Outlook to send and receive work-related emails, but the LuthorLex/ MadScientist credentials when using Outlook to further his illicit spamming and phishing activities. Because there are no exact matches across applications (as there were with Clark's multiple IDs), determining that the LLuthor and Brainiac IDs within the single-sign-on database are in fact associated with one individual is more difficult.

In such cases, the identity mapping module can rely on Lex's application usage history and/or profile as captured in the application activity logs. For example, if, while authenticated as LLuther and using Outlook as LuthorLex, Lex emails certain individuals, sets the application options to particular preferences, uses the application at odd times, and/or uses distinctive language in the subject or body of the email, these behaviors can be compared to Brainiac's usage profile of the same application. Although certain similarities may not independently provide strong enough evidence to warrant the attribution of both single-sign-on accounts to Lex, when combined with each other and/or with data from other applications, they may have a significant influence on the overall match probabilities. As a result, a user's application resource usage can be employed to discover the true identity of the individual associated with the application user ID.

Often, the process of identifying true identities associated with single-sign-on credentials and application authentication credentials described above is based on matches among application logon data, such as an account name, userID, and/or password, some of which may include personal identification information (e.g., social security number, employee number, etc.) In such cases, the user credentials can be encrypted. The encryption may occur prior to transmission to the identification server (e.g., as part of a periodic or manual procedure from each of the applications), during transmission, or once the credentials are stored in the identity signature data store. One exemplary approach is the use of a unique one-way hash for each combination of account name and password when a new application credential is entered into the database. The characteristic of the hash guarantees that the resulting key cannot be used to obtain the original account name or password, yet the key can be used as the basis for comparisons.

Figure 6:
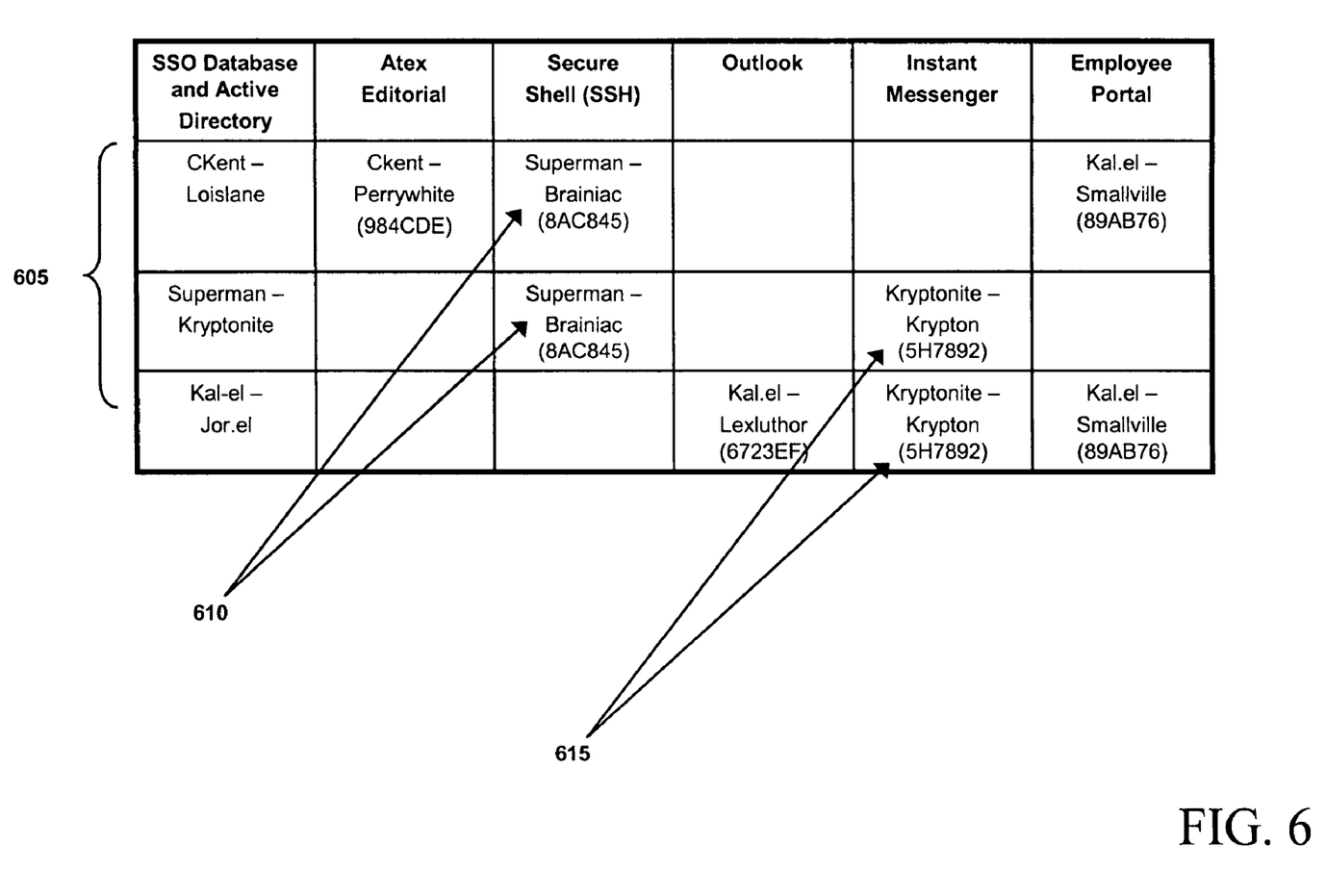
FIG. 6 is the tabular listing of FIG. 4 including obfuscated user-authentication credentials for multiple applications and a single-sign-on directory in accordance with the invention.

Referring to FIG. 6, a row-by-row comparison of column hash codes reveals a high correlation between the three single-sign-on user IDs 605 based on the common hash for the SSH IDs 610 and the Instant Messenger IDs 615. In order to reduce the search time for finding matches, it is also possible to build a relational table of hash entries against application account names to permit rapid identification of the number of similar matches for a given hash entry. Using the hash of the account ID and logon passwords allows the server to publish the information if needed (since there is no security implication to revealing the code) and also allows for rapid comparisons.

To further enhance the accuracy of the identity mapping module and the match probabilities, the system can also utilize data representing the physical state of users such as their locations within a building or their use of remote logon systems.

Typically, a physical access control system (PACS) manages access privileges to site locations by associating a person or group of people with one or more badge IDs that can be read, for example, by a card reader placed in close proximity to a locked door. One common implementation of a PACS uses Wiegand control signals to communicate signals from card readers placed about the controlled area to one or more control panels that determine whether to grant or deny access in accordance with various access policies. Based on these policies, the system generates electrical pulses using the Wiegand protocol that in turn control the door lock.

The physical access cards rely on the uniqueness of the card and its physical possession by a user, who either swipes it through a stripe reader or brings it into proximity of a wireless reader. The reader reads the card and transmits its unique badge identifier to a control panel that maintains a set of rules (or a general policy) for granting or denying access to the cardholder. Thus, various zones within a building can be controlled by placing readers at the entry points and doors that lead to protected zones. This creates a "transitive trust model" by granting the cardholder access privileges for a specific location based on the known relationship between the cardholder and the card, the rules dictating that cardholder's access rights to zones within a building, and the placement of readers at the entry points to those zones. Many companies have invested significant resources in implementing the physical and procedural infrastructure that supports such access-control systems.

Figure 7:
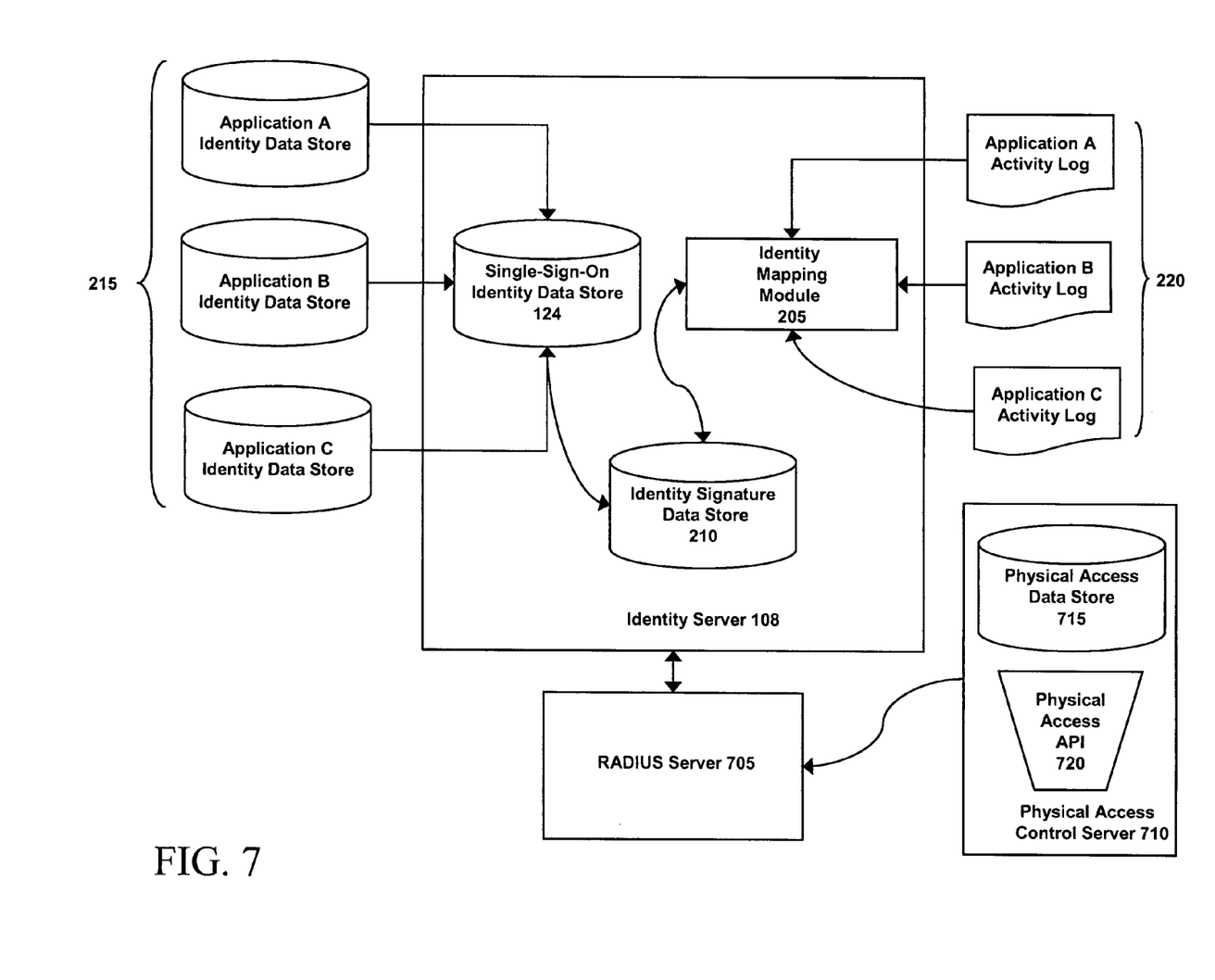
FIG. 7 is a block diagram of a system for consolidating and validating multiple application identification credentials across various logical and physical data stores in accordance with the invention.

Referring to FIG. 7, one or more RADIUS servers 705 can serve as an interface between the identity server 108 and the PACS 710 by providing one or more of a port, a server name and/or a shared secret. In such an implementation, the RADIUS protocol can be used for authenticating users against an external PAS server 705 such as SecureID or VacMan, marketed by VASCO SECURITY SYSTEMS which generally store physical access authentication data in a separate, secured data store 710. The RADIUS protocol is commonly used for providing access to secure applications (e.g., access to a VPN) and uses a trust model that relies on a shared secret between the RADIUS client and server. To initiate trust between the identity server 108 and the RADIUS server 705, the shared secret can be entered by the administrator and used by the identity server 108 to communicate (as a RADIUS client) with the RADIUS sever. As a result, the identity server 108 can pass RADIUS authentication information (such as a one-time-password, or OTP) from the user, through the VPN client, to the VPN server, and on to one or more authenticating RADIUS servers, thus providing strong authentication for network access from a remote client.

The identity server 108 provides a framework for inclusion of one or more PACS authenticators responsible for translating usernames and badge ID requests to the PACS via one or more authentication interfaces using, for example, APIs 720 or XML (e.g., using web services). The authentication interfaces can be designed to suit the individual interface for each PACS, and maintain responsibility for the setup and teardown of each authentication request and response, as well as generating the actual request generated by the identity server 108.

Conventional PACSs often include proprietary interfaces (APIs or XML), and therefore the invention provides an authentication interface on the RADIUS server that includes instructions for servicing the requests from the RADIUS server to the PACS, using APIs and/or messages native to the PACS. In one embodiment, a Java-based RADIUS server framework is used (such as that provided by AXL Systems, for example) and the authenticator code can be implemented in Java as an authenticator class that derives from a base class AccessImpl with a method authenticated. When a RADIUS request needs to be serviced, the authenticated method is called with an AuthInfo object that has all the relevant information about the request. Methods within the AuthInfo class provide methods for authentication, accounting, and logging. If the external PAS communicates over HTTPS and XML, the authenticate method formats and sends the message and waits for the response. A call to setAccessAccept( ) returns a positive response back to the single-sign-on server. If an API is used, a JNDI layer translates calls from Java to the native platform (and vice versa).

By providing PACS authentication data to the identity server 108, the identity mapping module 205 can incorporate both physical and logical authentication data when calculating match probabilities. Referring back to FIG. 5 and Lex Luthor's attempts to hide multiple identities, the probability that the LLuthor and Brainiac single-sign-on credentials are attributed to one individual may be below the minimum threshold that warrants consolidation of the accounts. However, if it can be determined that Lex Luthor swiped his PACS access card at a card reader near the computer from which both credentials were provided to the single-sign-on database, the probability that he is using both credentials may increase. Repeated instances of common application use and/or correlation with physical access events over time may further increase the probability above the threshold such that the two identities can be consolidated.

Figure 8:
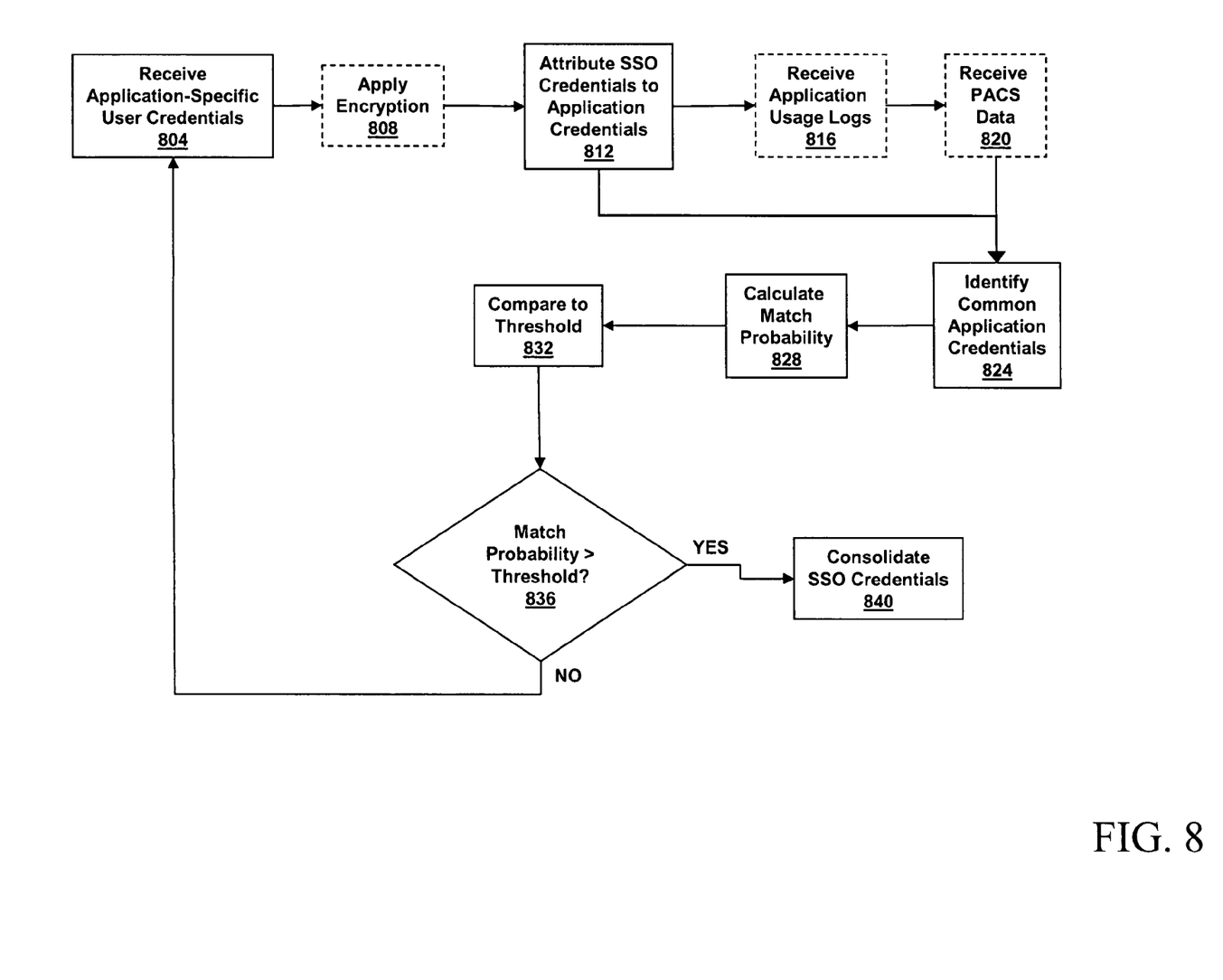
FIG. 8 is a flow diagram of a process for consolidating various user-authentication credentials in accordance with the invention.

FIG. 8 illustrates one exemplary process for identifying commonalities among application and single-sign-on authentication credentials. First, application-specific user credentials (e.g., UserIDs, passwords, etc.) are received (STEP 804) at the identity server. In some embodiments, the credentials are encrypted (STEP 808) to safeguard the credentials and allow other users to analyze the data without compromising the security of the data. single-sign-on authentication credentials are then associated with the application credentials (STEP 812) by, for example, retrieving the single-sign-on credentials from a single-sign-on identity store, a client-resident single-sign-on agent, or both. In some instances, the received credentials can be augmented with application usage data (STEP 816) and/or data from one or more PACS (STEP 820).

The identity mapping module then identifies common application credentials, application usage patterns, and physical activities (STEP 824) and calculates a probability that two or more single-sign-on credentials can be attributed to one individual (STEP 828). The probability is then compared to a threshold (STEP 832) and if the match probability is greater than the threshold (DECISION STEP 836), the single-sign-on credentials are deemed to be candidates for consolidation (STEP 840). If not, the process can repeat, such that over time additional data can be used to compute a more accurate match probability.

The invention may be configured to run on any computer or workstation such as a PC or PC-compatible machine, an Apple Macintosh, a Sun workstation, or other similar machine as software, hardware, or a combination. In general, any device can be used as long as it is able to perform all of the functions and capabilities described herein. The particular type of computer or workstation is not central to the invention, nor is the configuration, location, or design of the database, which may be flat-file, relational, or object-oriented, and may include one or more physical and/or logical components.

The identity server may include a network interface continuously connected to the network, and thus support numerous geographically dispersed users and applications. In a typical implementation, the network interface and the other internal components of the identity server intercommunicate over a main bi-directional bus. The main sequence of instructions effectuating the functions of the invention and facilitating interaction among clients, servers and a network, as well as the identity database, can reside on a mass storage device (such as a hard disk or optical storage unit) as well as in a main system memory during operation. Execution of these instructions and effectuation of the functions of the invention is accomplished by a central-processing unit ("CPU").

A group of functional modules that control the operation of CPU and effectuate the operations of the invention as described above can be located in system memory (on the identity server or on a separate machine, as desired). An operating system directs the execution of low-level, basic system functions such as memory allocation, file management, and operation of mass storage devices. At a higher level, a control block, implemented as a series of stored instructions, responds to client-originated queries by analyzing the identity database in the manner described above and returning identity information (including, if desired, an indication of the probability that the returned identity is correct).

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for attributing a plurality of user-authentication credentials to an individual, the method comprising:
receiving, at an identity server machine, a plurality of user-authentication credentials, each being different from the others and associated with a different computer application;
inferring association, at the identity server machine, between different ones of the plurality of user-authentication credentials and a single individual, based on consistencies among the associated authentication credentials and observed application usage patterns attributed to each user-authentication credential, the observed application usage comprising one or more of logging into an operating system, logging into an application, using one or more functions within an application and navigating to one or more screens within an application;
creating, at the identity server machine, an identity signature for the single individual based on the different user-authentication credentials associated with the single individual; and
identifying, at the identity server machine, the individual based on the identity signature.

2. The method of claim 1 wherein the user-authentication credentials comprise one or more of an identification code, a secure access code, a screen name, and/or a password for granting a user's access to one or more applications.

3. The method of claim 1 wherein the plurality of user-authentication credentials are encrypted.

4. The method of claim 3 wherein the plurality of user-authentication credentials are encrypted prior to receipt.

5. The method of claim 3 wherein the encryption comprises application of a hash to the plurality of user-authentication credentials, and the associating step using the hashed user-authentication credentials.

6. The method of claim 1 wherein the user-authentication credentials comprise biometric data.

7. The method of claim 1 wherein the observed application usage comprises one or more of static observations and dynamic observations.

8. The method of claim 1 wherein the consistencies comprise similarities of application usage attributed to the authentication credentials.

9. The method of claim 1 further comprising calculating a match probability for at least one of the associations.

10. The method of claim 9 wherein the authentication credentials included in the identity signature are determined at least in part by the calculated probabilities.

11. The method of claim 10 further comprising weighting each of the authentication credentials prior to calculating the match probability.

12. The method of claim 1 further comprising determining whether a match probability exceeds a threshold, the identity signature being created for the individual only if the match probability exceeds the threshold.

13. The method of claim 1 further comprising receiving physical access data and including the physical access data in the identity signature.

14. A system for attributing computer system user-authentication credentials to an individual, the system comprising:
an identity server machine comprising:
an identity signature data store for storing user-authentication credentials in connection with a plurality of different computer applications, the user-authentication credentials being different from each other; and
a mapping module for (i) inferring association between different ones of the user-authentication credentials and a single individual, the association being inferred based on consistencies among the user-authentication credentials and observed application usage patterns attributed to each respective user-authentication credential, wherein the observed application usage comprises one or more of logging into an operating system, logging into an application, using one or more functions within an application and navigating to one or more screens within an application; and (ii) creating a single user signature for the individual based on the association.

15. The system of claim 12 further comprising a single-sign-on agent for:
receiving the user-authentication credentials from the identification server;
transmitting at least a part of the user-authentication credentials to one or more computer applications;
receiving, from the one or more computer applications, user-authentication credentials attributed to each of the plurality of computer applications; and
transmitting the user-authentication credentials attributed to each of the plurality of computer applications to the mapping module.

16. The system of claim 14 wherein the identity mapping module infers relationships among the user-authentication credentials.

17. The system of claim 14 further comprising a physical access system interface configured to receive data from a physical access system.

18. An article of manufacture having non-transitory computer-readable program portions embodied thereon for attributing user-authentication credentials to an individual, the article comprising computer-readable instructions for:
receiving, at an identity server machine, a plurality of user-authentication credentials, each being different from the others and associated with a different computer application;
inferring association, at the identity server machine, between different ones of the plurality of user-authentication credentials and a single individual, based on consistencies among the associated authentication credentials and observed application usage patterns attributed to each user-authentication credential, the observed application usage comprising one or more of logging into an operating system, logging into an application, using one or more functions within an application and navigating to one or more screens within an application;
creating, at the identity server machine, an identity signature for the single individual based on the different user-authentication credentials associated with the single individual; and
identifying, at the identity server machine, the individual based on the identity signature.

19. A method for attributing user-authentication credentials to an individual, the method comprising:
receiving at an identity server machine a plurality of user-authentication credentials each being different from the others and associated with a different computer application;
monitoring activities attributed to each respective user-authentication credential;
inferring association between different ones of the plurality of user-authentication credentials and a single individual, based on consistencies among the associated authentication credentials and observed application usage patterns attributed to each user-authentication credential, the observed application usage comprising one or more of logging into an operating system, logging into an application, using one or more functions within an application and navigating to one or more screens within an application; and
based on the monitored activities and the inferred association, and notwithstanding the differences among the user-authentication credentials, determining at the identity server machine whether a likelihood that a new activity is associated with a single user exceeds a predetermined threshold.

20. The method of claim 19 wherein the monitored activities comprise logging on to one or more secure computer systems.

21. The method of claim 19 wherein the monitored activities comprise physically entering a secure environment.

22. The method of claim 19 wherein the monitored activities comprise computer application usage activities.

23. A method of detecting shared usage of user-authentication credentials, the method comprising:
receiving, at an identity server machine, a plurality of requests for access to a secure resource, each request comprising one or more user-authentication credentials attributed to a different user;
constructing, at the identity server machine, a request profile for each request based at least in part on the provided user-authentication credentials;
inferring association, at the identity server machine, between different ones of the plurality of request profiles and a single set of user-authentication credentials, based on consistencies among the associated authentication credentials and observed application usage patterns attributed to each user-authentication credential, the observed application usage comprising one or more of logging into an operating system, logging into an application, using one or more functions within an application and navigating to one or more screens within an application; and
identifying, at the identity server machine and based on the inferred association, identical user-authentication credentials received in two or more of the requests having different request profiles, thereby detecting shared usage of the identical user-authentication credentials.

24. The method of claim 23 wherein the identical user-authentication credentials are exact matches.

25. The method of claim 23 wherein the user-authentication credentials comprise one or more of an identification code, a secure access code, a screen name, and/or a password for granting a user's access to one or more applications.

26. The method of claim 23 wherein the plurality of user-authentication credentials are encrypted.

27. The method of claim 26 wherein the plurality of user-authentication credentials are encrypted prior to receipt.

28. The method of claim 26 wherein the encryption comprises application of a hash to the plurality of user-authentication credentials, and the associating step using the hashed user-authentication credentials.

29. The method of claim 23 wherein the user-authentication credentials comprise biometric data.

* * * * *